May 5, 1931.                J. W. WHIPP                1,804,241
                             WIND MOTOR
                    Filed Sept. 9, 1929    3 Sheets-Sheet 1
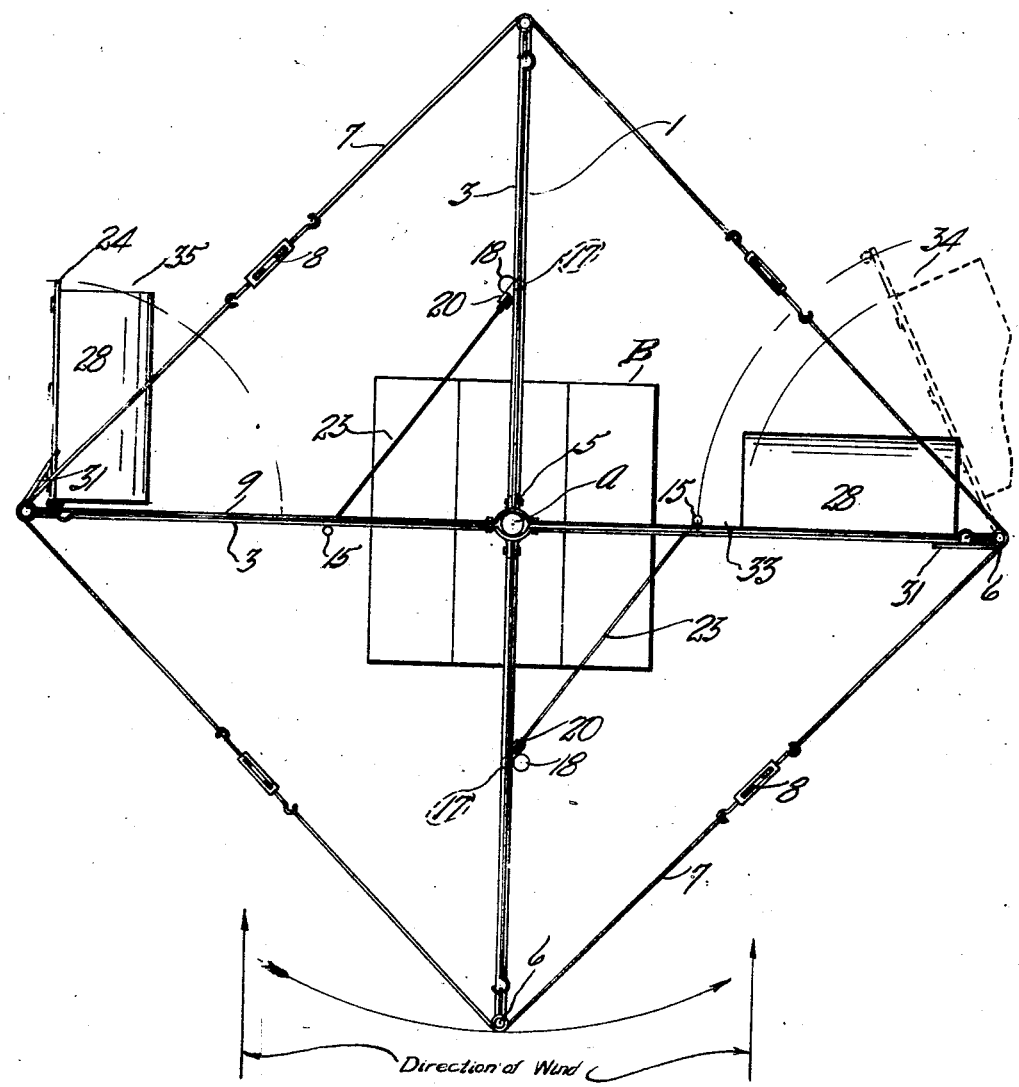
Inventor
John William Whipp
Adam E. Fisher
Attorney

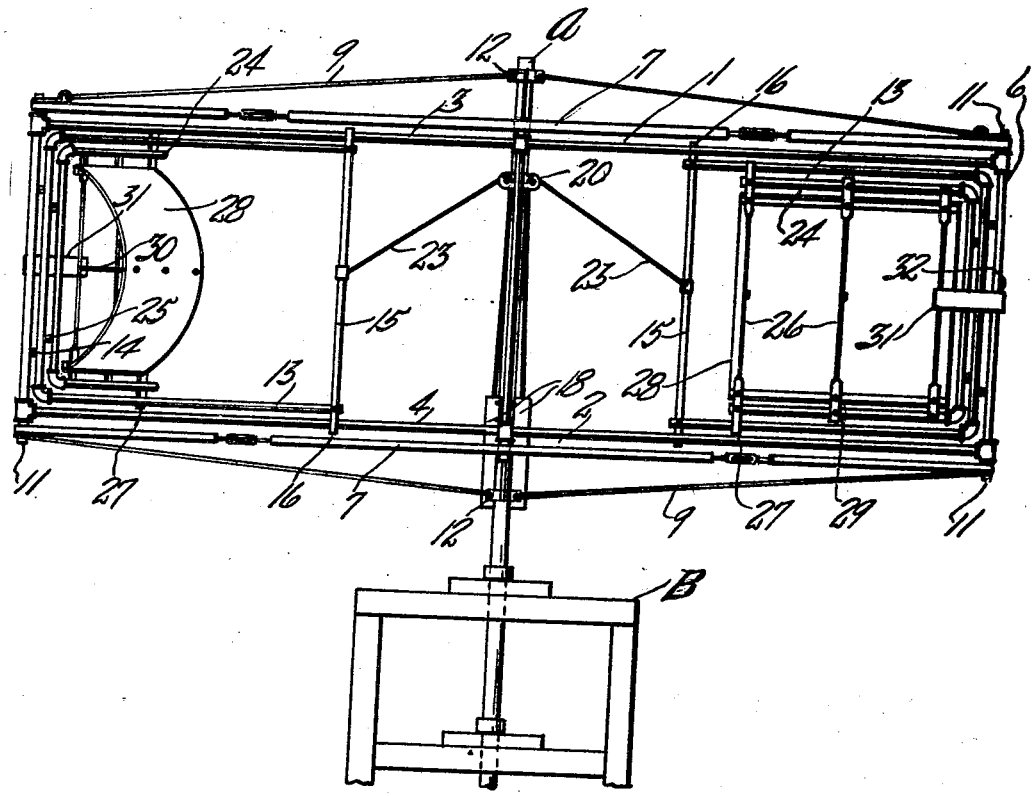

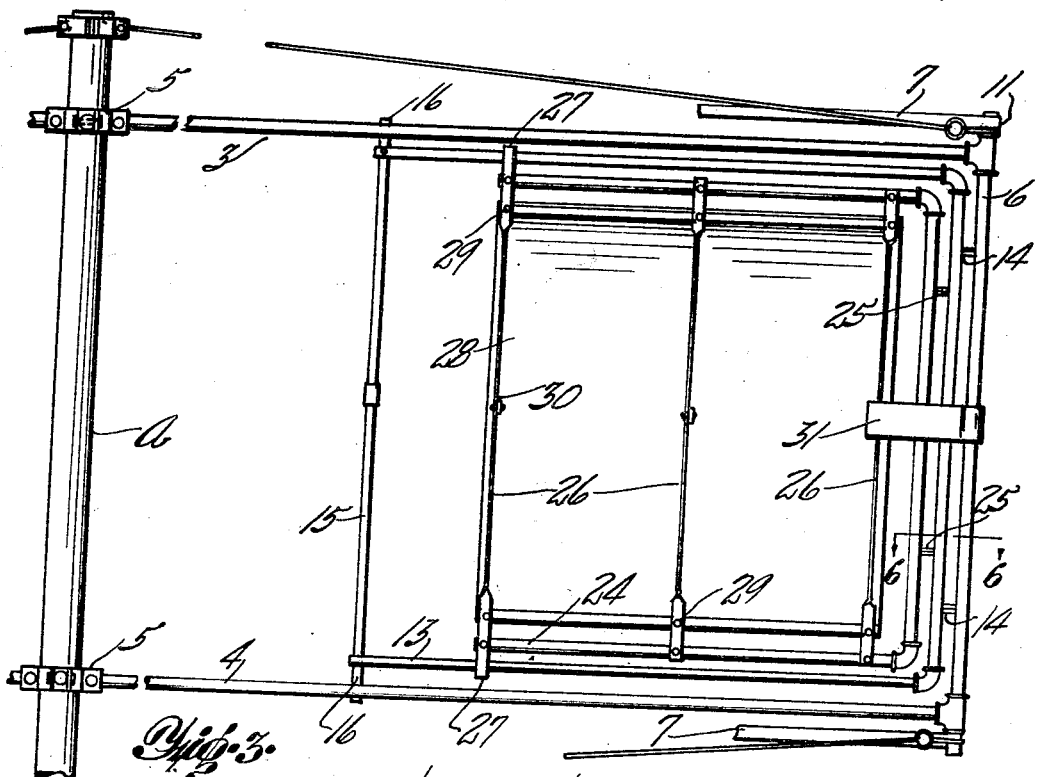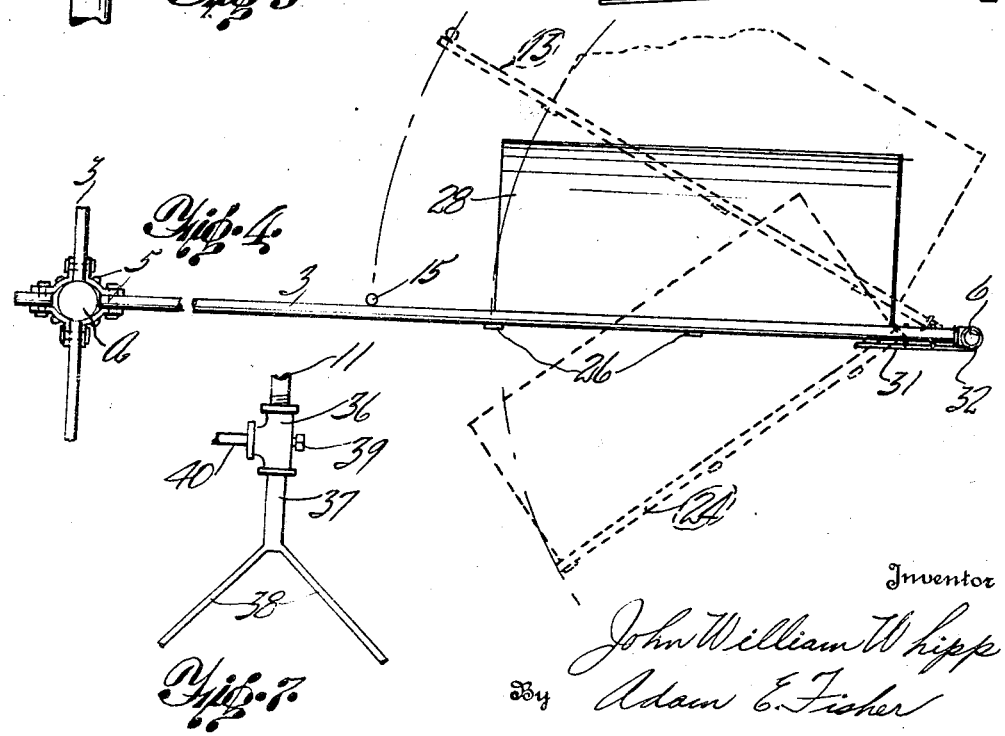

Patented May 5, 1931

1,804,241

UNITED STATES PATENT OFFICE

JOHN WILLIAM WHIPP, OF EUREKA SPRINGS, ARKANSAS, ASSIGNOR OF ONE-HALF TO W. J. LLOYD, OF EUREKA SPRINGS, ARKANSAS

WIND MOTOR

Application filed September 9, 1929. Serial No. 391,179.

This invention relates to wind motors and the main object is to provide a simple and efficient mechanism of this kind in which the wind catching elements are yieldably held in position to receive the wind so that when the velocity of the wind reaches a point which would cause the motor to rotate too fast the said wind catching elements will be forced away from their operative position so as to present a minimum surface to the wind.

Another object is to provide a wind motor in which the wind catching elements are so mounted that when they are not actually engaged in operating the motor they will swing freely in the wind and present a minimum surface to the wind thus causing the motor to run freely.

A further object is to provide a means for mounting swings or seats below the motor so that the device may also serve as amusement machine as well as a power generating machine.

With these and other objects in view the invention resides in the novel construction and arrangement of parts as hereinafter set forth and claimed.

In the drawings:

Figure 1 is a plan view of the wind motor.

Figure 2 is a side view thereof.

Figure 3 is an enlarged side view of a portion of the frame showing the mounting of the wind catching elements.

Figure 4 is a plan view of the structure shown in Figure 3.

Figure 5 is a detail view of the mounting of one of the weights.

Figure 6 is an enlarged section along the line 6—6 in Figure 3.

Figure 7 is a detail view of the mounting for the swings or chairs.

Referring now more particularly to the drawings, the reference character A denotes a vertical center post or shaft suitably journaled in and supported on the base B which may be of any desired form. Upper and lower horizontal frame sections 1 and 2 are secured in vertically spaced relationship upon the post A, the said sections 1 and 2 comprising the upper or lower beams or spokes 3 and 4 extended radially from the said center post at right angles to each other and connected to the said post A by clamps 5. The outer ends of each of the upper and lower beams 3 and 4 are connected by vertical end bars 6, the framework thus formed being braced by braces 7 having turnbuckles 8 and the guy rods 9. The beams 3 and 4 and the end bars 6 may be formed of pipe connected by elbows or couplings 10 of the required form as shown and short nipples 11 may be seated in the outer couplings 11 to receive the braces 7 and guy rods 9. The inner ends of these guy rods 9 are connected to the center post A by clamps 12 similar to the clamps 5, aforesaid.

U-shaped outer frames 13 are provided, the same preferably being formed of pipes connected together by elbows as shown and being hinged at 14 to diametrically opposite end bars 6 to swing in a horizontal plane between the beams 3 and 4. The inner or free ends of the upper and lower horizontal arms of the frames 13 are connected by vertically disposed bars 15 extended to form catches 16 which will engage the beams 3 and 4 to limit the swing of the frames 13, this swinging movement being in the direction in which the motor rotates or away from the wind when the sails to be hereinafter described, are in position to receive the wind. The beams 3 and 4 intervening between the beams carrying the said frames 13 are provided with medially located vertical slide rods 17 and weights 18 having slide rings 19 are slidably mounted by these rings upon the slide rods 17. Pulleys 20 are loosely mounted by their brackets 21 between collars 22 fixed adjacent the upper ends of the slide rods 17 and cables 23 are secured to the weights 18, trained over the pulleys 20 and connected to the bars 15 on the outer frames 13 in such manner that these frames 13 are normally held within the beams 3 and 4 with their catches 16 in engagement with these beams as shown in Figure 1 of the drawings.

U-shaped inner sail frames 24 are hinged at 25 in the outer frames 13 and spaced vertical braces 26 are secured on the upper and lower arms of these frames 24, the inner braces 26 being extended to form catches 27 which will engage the upper and lower horizontal arms of the outer frames 13 to allow the said inner frames 24 to swing away from the outer frames 13 in only one direction. The inner sail frames 24 are thus not swung or affected by the swinging of the said outer frames 13. The sails 28 are formed of sheet material curved or bowed as shown and are secured by their upper and lower margins to the braces 26 at 29, the sails being so positioned that they present their concaved surfaces to the wind when they are in position to receive the wind. The sails 28 are braced by tie rods 30 which are connected to the braces 26 and to a medial point of the sails as shown. Leaf springs 31 are secured at 32 to the end bars 6 and are extended inwardly into engagement with the outer braces 26 as shown, these springs serving to normally hold the inner sail frames 24 closed with the catches 27 in engagement with the outer frames 13 as will be understood.

In operation the weights 18 serve to normally hold the outer frames 13 between the beams 3 and 4 or in position to hold the sails 28 into the wind as denoted by the numeral 33 in Figure 1. When the wind increases in force to a point where it would turn the motor too fast it will overcome the pull of the weight 18 swinging the outer frame 13 and inner sail frame 24 outward so that the sails 18 will not receive the full force of the wind as shown in dotted lines at 34 in Figure 1. The weights 18 may of course be varied in size so that they will release the sails at any desired wind pressure. When the sails are moving against the wind which they do during a part of the rotation of the motor the inner sail frames 24 may swing back against the springs 31 as shown at 35 in Figure 1 so that the sails will present very little surface to the wind thus making the motor run easily. While only two sail assemblies are here shown it is obvious that more may be used if desired.

Figure 7 illustrates a means for attaching seats or swings to the motor so that it may also serve as an amusement device. A T-coupling 36 is secured on the lower ends of each of the lower nipples 11 and a hanger 37 having the divergent arms 38 is threaded in the coupling and secured by a screw 39. The seat or swing (not shown) may be hung from the arms 38 in any suitable manner. 40 denotes a brace rod which may be connected between the coupling 36 and the center post A of the motor.

While I have herein set forth a certain preferred embodiment of my invention, it is understood that I may vary from the same in minor structural details, not departing from the spirit of the invention and within the scope of the appended claim.

I claim:

In a wind motor, a rotatable motor frame including radially extended pairs of vertically spaced spokes and vertical end bars connecting the spokes at their outer ends, outer frames hinged on the end bars of alternate pairs of spokes, catches upon the said outer frames and adapted to engage the said spokes, slide rods mounted on the pairs of spokes intervening between those carrying the outer frames, weights slidably mounted on the said slide rods, pulleys mounted on the slide rods, cables trained over the pulleys and connected at their ends to the weights and the inner ends of the outer frames, inner sail frames hinged to the outer ends of the said outer frames, sails mounted in the said inner sail frames, the said sails being bowed outward from top to bottom, catches upon the inner ends of the inner sail frames and adapted to engage the outer frames upon the side opposite to which the said outer frame catches are disposed, and leaf springs secured to the said frame end bars and engaging the said inner frames to normally hold the same swung within the outer frames.

In testimony whereof I affix my signature.

JOHN WILLIAM WHIPP.